United States Patent
Shinn et al.

(10) Patent No.: US 9,384,103 B2
(45) Date of Patent: Jul. 5, 2016

(54) EJB CLUSTER TIMER

(75) Inventors: Matthew Shinn, San Francisco, CA (US); Naresh Revanuru, Fremont, CA (US); Dean Bernard Jacobs, Berkeley, CA (US); Prasad Peddada, Fairfield, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1717 days.

(21) Appl. No.: 11/749,046

(22) Filed: May 15, 2007

(65) Prior Publication Data
US 2007/0288481 A1   Dec. 13, 2007

Related U.S. Application Data

(60) Provisional application No. 60/747,364, filed on May 16, 2006, provisional application No. 60/909,179, filed on Mar. 30, 2007.

(51) Int. Cl.
| | |
|---|---|
| *G06F 9/46* | (2006.01) |
| *G06F 15/16* | (2006.01) |
| *G06F 15/173* | (2006.01) |
| *G06F 11/20* | (2006.01) |

(52) U.S. Cl.
CPC ......... *G06F 11/2035* (2013.01); *G06F 11/203* (2013.01); *G06F 11/2046* (2013.01)

(58) Field of Classification Search
None
See application file for complete search history.

(56) References Cited

U.S. PATENT DOCUMENTS

| | | |
|---|---|---|
| 5,951,694 A | 9/1999 | Choquier |
| 6,163,855 A | 12/2000 | Shrivastava et al. |
| 6,539,494 B1 | 3/2003 | Abramson |
| 6,581,166 B1 | 6/2003 | Hirst et al. |
| 6,845,503 B1 * | 1/2005 | Carlson et al. ............... 717/166 |
| 6,854,069 B2 | 2/2005 | Kampe et al. |
| 6,859,834 B1 | 2/2005 | Arora |
| 6,889,338 B2 * | 5/2005 | Srinivasan et al. ............ 714/4.1 |
| 6,934,755 B1 * | 8/2005 | Saulpaugh et al. .......... 709/226 |
| 7,010,617 B2 | 3/2006 | Kampe et al. |
| 7,039,694 B2 | 5/2006 | Kampe et al. |
| 7,058,846 B1 | 6/2006 | Kelkar et al. |
| 7,191,358 B2 | 3/2007 | Fujibayashi |

(Continued)

FOREIGN PATENT DOCUMENTS

| | | |
|---|---|---|
| CN | 19392701 A | 1/2003 |
| CN | 1719831 A | 1/2006 |

OTHER PUBLICATIONS

Gray et al., "Leases: An Efficient Fault-Tolerant Mechanism for Distributed File Cache Consistency", 1989, ACM 089791-338-3/89/0012/0202.*

(Continued)

*Primary Examiner* — Lewis A Bullock, Jr.
*Assistant Examiner* — Kevin X Lu
(74) *Attorney, Agent, or Firm* — Tucker Ellis LLP

(57) ABSTRACT

Multiple application server instances can be arranged in a cluster that implements a distributed EJB timer system. A high availability database can store EJB timer info. The EJB timer jobs can be distributed among the application server instances of the cluster that implement the distributed EJB timer system. In case of a failure of an application server instance, the EJB timer info can be used to reassign the EJB timer jobs associated with the failed application server instance.

18 Claims, 5 Drawing Sheets

(56) References Cited

U.S. PATENT DOCUMENTS

| | | | |
|---|---|---|---|
| 7,203,863 B2 | 4/2007 | Pavlik | |
| 7,210,148 B2* | 4/2007 | Arnold | G06F 9/5044 709/203 |
| 7,243,142 B2 | 7/2007 | Poirot et al. | |
| 7,302,609 B2 | 11/2007 | Matena et al. | |
| 7,370,223 B2 | 5/2008 | Olmstead et al. | |
| 7,392,421 B1 | 6/2008 | Bloomstein et al. | |
| 7,395,327 B2 | 7/2008 | Bae et al. | |
| 7,451,221 B2* | 11/2008 | Basani et al. | 709/226 |
| 7,451,359 B1 | 11/2008 | Coekaerts | |
| 2002/0069094 A1* | 6/2002 | Bingham et al. | 705/5 |
| 2003/0055929 A1 | 3/2003 | Ding et al. | |
| 2003/0084062 A1 | 5/2003 | Young | |
| 2003/0135509 A1* | 7/2003 | Davis et al. | 707/100 |
| 2003/0163755 A1 | 8/2003 | Fung | |
| 2003/0177411 A1 | 9/2003 | Dinker et al. | |
| 2003/0233433 A1 | 12/2003 | Halpern | |
| 2004/0153558 A1* | 8/2004 | Gunduc et al. | 709/229 |
| 2004/0158588 A1 | 8/2004 | Pruet | |
| 2004/0215762 A1* | 10/2004 | Oulu | G06F 11/3495 709/223 |
| 2005/0005200 A1* | 1/2005 | Matena et al. | 714/38 |
| 2005/0063005 A1* | 3/2005 | Phillips et al. | 358/1.15 |
| 2005/0071452 A1 | 3/2005 | Rosenstock et al. | |
| 2005/0078681 A1 | 4/2005 | Sanuki | |
| 2005/0246569 A1* | 11/2005 | Ballew et al. | 714/4 |
| 2005/0246713 A1* | 11/2005 | Creamer et al. | 719/310 |
| 2005/0262091 A1* | 11/2005 | Marvin et al. | 707/10 |
| 2005/0262411 A1 | 11/2005 | Vertes et al. | |
| 2006/0048017 A1 | 3/2006 | Anerousis et al. | |
| 2006/0074994 A1* | 4/2006 | Smits | 707/201 |
| 2006/0167887 A1* | 7/2006 | Galchev | 707/10 |
| 2006/0187906 A1 | 8/2006 | Bedi et al. | |
| 2006/0195560 A1* | 8/2006 | Newport | 709/223 |
| 2006/0294417 A1* | 12/2006 | Awasthi et al. | 714/10 |
| 2007/0050340 A1* | 3/2007 | von Kaenel et al. | 707/3 |
| 2007/0174661 A1 | 7/2007 | Peddada | |
| 2007/0240145 A1* | 10/2007 | Saroj | G06F 8/61 717/168 |

OTHER PUBLICATIONS

Unknown Author, "Hello World! A Basic EJB example", openejb.codehaus.org/hello-world.html, Mar. 1, 2003.*

Srinivasan, "EJB 3.0 Timer Services", www.javabeat.net/ejb-3-0-timer-services-an-overview/, Mar. 28, 2007.*

Unknown Author, "The Class Loader Hierarch", http://docs.oracle.com/cd/E19501-01/819-3659/beadf/index.html, May 6, 2006.*

Unknown Author, "Oracle GlassFishServer 3.1 Application Deployment Guide"—"To Deploy an EJB Timer to a Cluster", p. 153-156, docs.oracle.com/cd/E18930_01/pdf/821-2418.pdf, Aug. 2, 2004.*

Unknown Author, "Whole Server Migration"—"Leasing", docs.oracle.com/middleware/1212/wls/CLUST/migration.htm#CLUST262, Dec. 16, 2004.*

Unknown author, "Class Loading—Oracle Documentation", docs.oracle.com/javase/jndi/tutorial/beyond/misc/classloader.html, Feb. 1, 2001.*

International Search Report for PCT/US07/60102, dated Feb. 15, 2008, 7 pages.

Lamport, "Paxos Made Simple", Nov. 1, 2001, pp. 1-14.

State Intellectual Property Office of the People's Republic of China, Search Report for Chinese Patent Application No. 201310125906.1, Office Action dated Sep. 1, 2015, 2 pages.

* cited by examiner

EJB CLUSTER TIMER

CLAIM OF PRIORITY

This application claims priority to U.S. Provisional Application No. 60/747,364 entitled "NEXT GENERATION CLUSTERING" filed May 16, 2006 and to U.S. Provisional Application No. 60/909,179 entitled "EJB CLUSTER TIMER" filed Mar. 30, 2007, which applications are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

Enterprise Java Bean ("EJB") containers are quite popular for many types of applications. Typically, EJBs are used to contain, secure and persist business logic.

The EJB 2.1 Specification includes an EJB timer Application Programming Interface ("API"). The EJB Timer API allows for the running of EJBs at predetermined times specified by the EJB Timer API. This allows the running of EJB code to be scheduled for times when the overall system utilization is low.

DETAILED DESCRIPTION

An application server can be a server computer on a computer network dedicated to running certain software applications (as opposed to e.g. a file server or print server). Generally, an application server, such as the WebLogic Server™ available from BEA Systems, Inc., of San Jose, Calif., can be a software engine that delivers applications to client computers. In some cases, an application server can handle most, if not all, of the business logic and data access of the application. Benefits of application server technology can include the ease of application development and centralization. A J2EE application server refers to an application server that can comply with Java 2 Platform, Enterprise Edition (J2EE) standard.

An application server cluster can consist of multiple application server instances running simultaneously and working together to provide increased scalability and reliability. A cluster can appear to clients to be a single application server instance. The server instances that constitute a cluster can run on the same machine, or be located on different machines. Users can increase a cluster's capacity by adding additional server instances to the cluster on an existing machine, or user can add machines to the cluster to host the incremental server instances.

Some of the services of the application servers, called singleton services should be run on only one application server of a cluster. These singleton services can include JMS servers, transaction recovery services or any other software that should be only run in a single instance.

One way of implementing the EJB timer API is for each application server in a cluster that receives EJB timer API requests to store the EJB timer and at the time indicated through the EJB timer API will run an EJB. One downside of this implementation is that when new application server instances join the cluster they will not run any of the EJB timer jobs until they receive new EJB timer API requests. This may mean that the EJB timer jobs at the time of their execution are not well distributed. Additionally, in the case of a failure of an application server instance, recovery of the EJB timer jobs held by that application server instance will be relatively slow since they will need to wait for the recovery of the entire application server instance.

Figure 1:
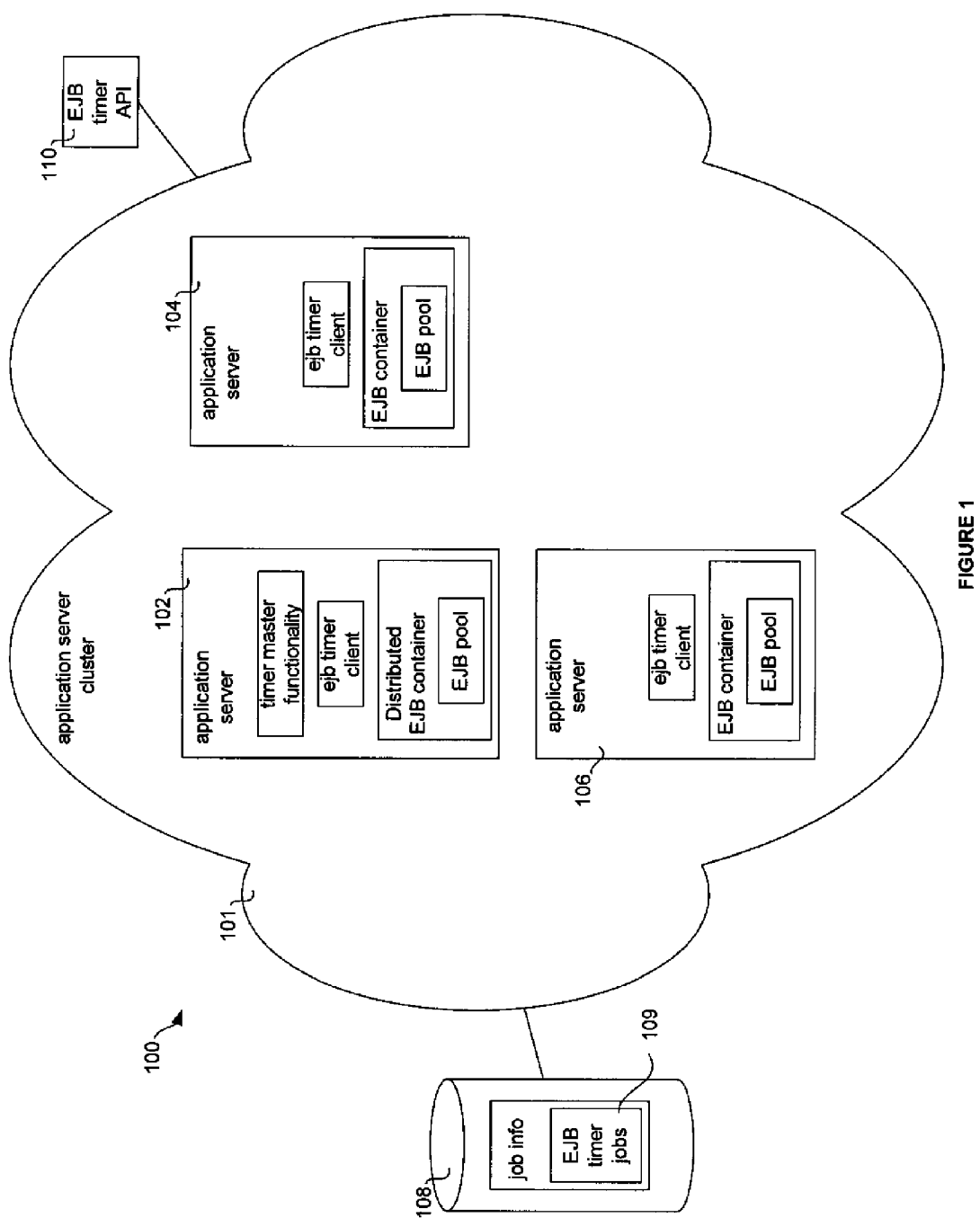
FIG. 1 shows a clustered EJB timer system of one embodiment of the present invention.

Embodiments of the present invention concern a distributed EJB timer system 100. The EJB timer information can be stored in a central location. EJB timer requests from the EJB Timer API 110 can enter into the application server cluster 101. In the example of FIG. 1, application server distances 102, 104, and 106 can store the EJB timer information in a database 108, such as high availability (HA) database.

One of the application servers, such as Application Server 102, can have timer master functionality. The timer master can get the EJB timer job info from the database then distribute the EJB timer jobs to the EJB timer clients at the application servers, such as Application Servers 102, 104 and 106. When the EJB timer triggers for a job, the local EJB pool at the application server can then set up the EJB and do the required processing.

In this example, the EJB timer jobs are distributed close to their time of execution so that newly added application servers are able to get EJB jobs near their time of execution. This can mean that the EJB timer jobs as a whole will be well distributed. Upon a failure of an application server instance, EJB timer jobs can be quickly reassigned to a new application server instance without waiting to recover the entire failed application server instance.

One embodiment of the present system 100 has multiple application server instances 102, 104, 106 in a cluster 101, the cluster 101 implementing a distributed EJB timer system. A high availability database 108 can store EJB timer info 109. EJB timer jobs can be distributed among the application server instances 102, 104, 106 of the cluster that implement the distributed EJB timer system. In case of a failure of an application server instance, such as a failure of application server 104, the EJB timer info 109 can used to reassign the EJB timer jobs associated with the failed application server instance.

One of the application server instances 102 can act as a timer master. The timer master can assign and reassign the EJB timer jobs to other application server instances. In case of a failure of the application server instance acting as timer master, another application server in the cluster can be reassigned the timer master functionality.

In one embodiment, the timer master functionality can be assigned to another application server by a migration master. The timer master can schedule jobs in addition to the EJB timer jobs. The timer master can maintain a timer master lease. The other application servers can request EJB timer jobs from the timer master. Each application server instance 102, 104, and 106 that is a part of the EJB timer system can view all of the scheduled EJB timer jobs via the high availability database 108. The cluster can contain an application server instance that is not part of the distributed EJB timer system.

An application server instance can include code that allows the application server instance to form part of a cluster that implements a distributed EJB timer system. The application server instance can include code that allows the application server instance to act as a timer master and distribute EJB timer jobs to other application server instances of the cluster. In case of a failure of one of the other application server instances, EJB timer jobs associated with the failed application server instance can be reassigned.

FIGS. 2A-2E illustrates the operation of one embodiment of a distributed EJB timer system.

Figure 2A:
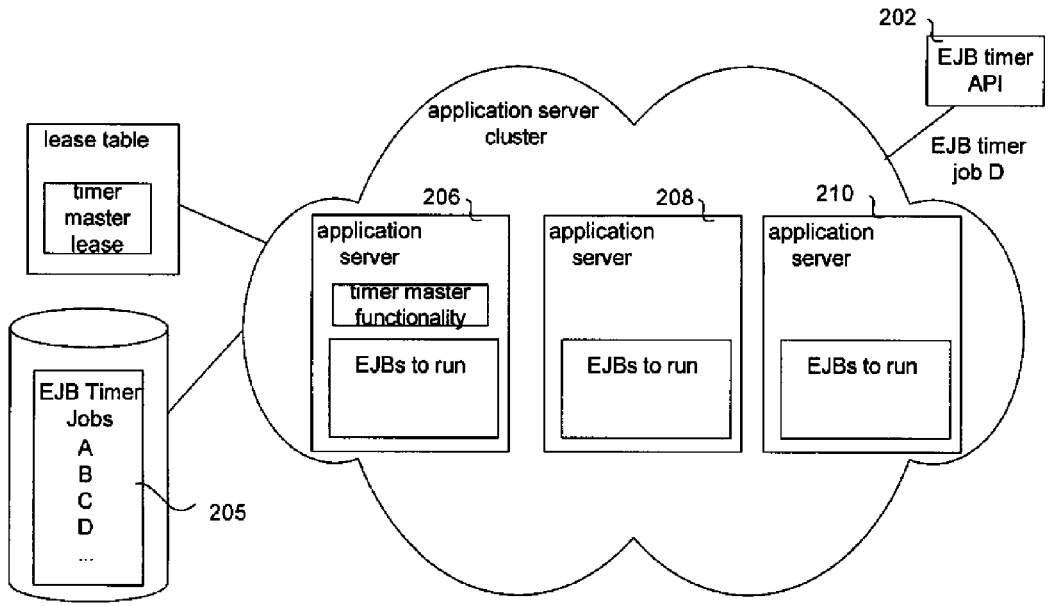
FIG. 2A-2E show examples of the operation of a clustered EJB timer system of one embodiment of the present invention.

In the example of FIG. 2A, EJB timer API 202 is used to input an EJB timer job into the cluster. In this case, EJB timer job D is to be executed at midnight. The EJB timer job D information joins the information for EJB timer jobs A, B and C (that are also to be executed at midnight) in central location 205.

Figure 2B:
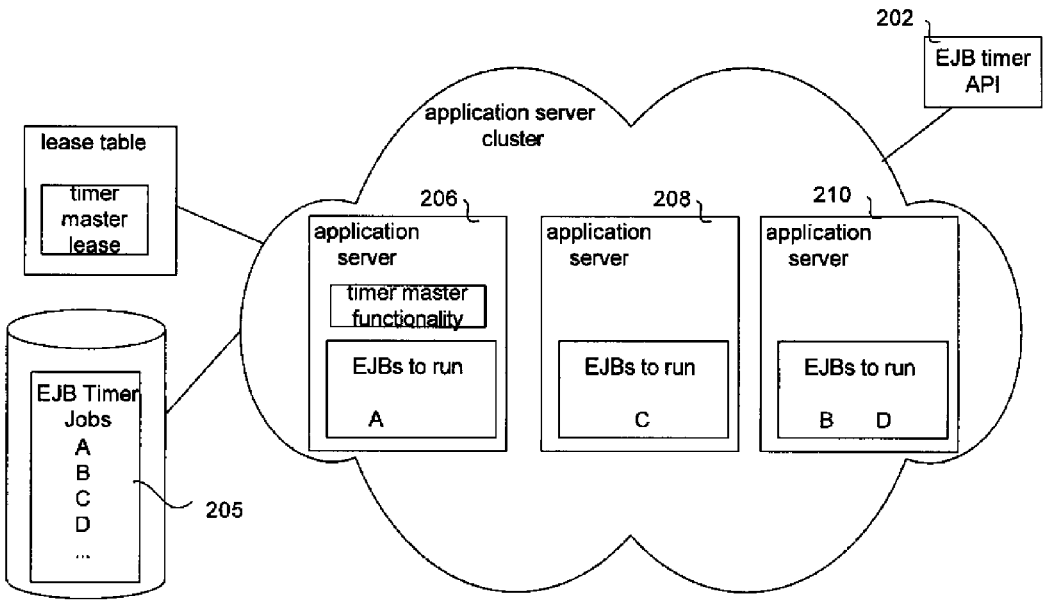

Periodically, as shown in FIG. 2B, the application server instance 206 acting as the timer master gets the EJB timer job information from central location 205. The application server instance 206 acting as the timer master distributes these EJB timer jobs for execution. Each application server that can run EJB timer jobs can request them from the application server instance 206 that is running the timer master.

Figure 2C:
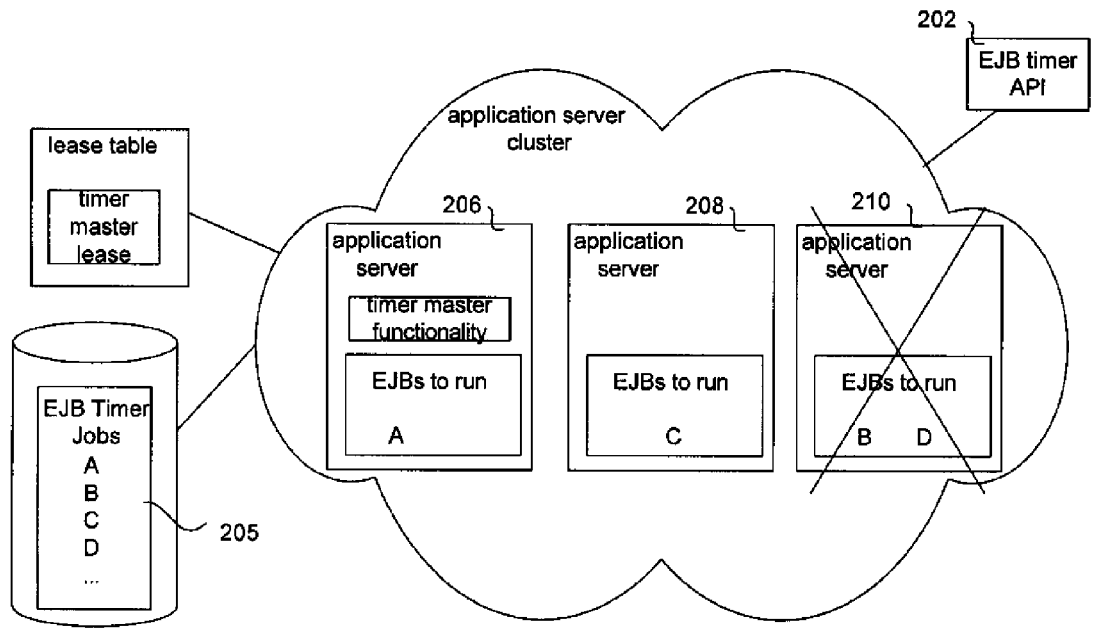
Figure 2D:
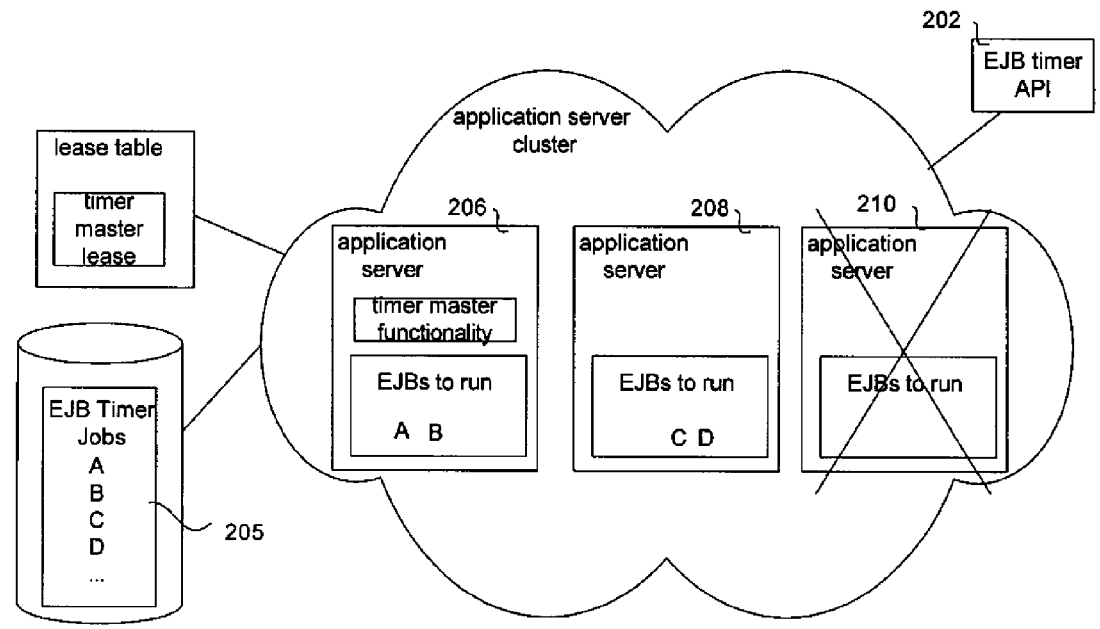

In FIG. 2C, application server instance 210 fails. The application server instance 206 acting as the timer master can realize that application server instance 206 has failed and then can, as shown in FIG. 2D redistribute the EJB timer jobs B and D by obtaining them from the central location or from a local storage at application instance 206.

Figure 2E:
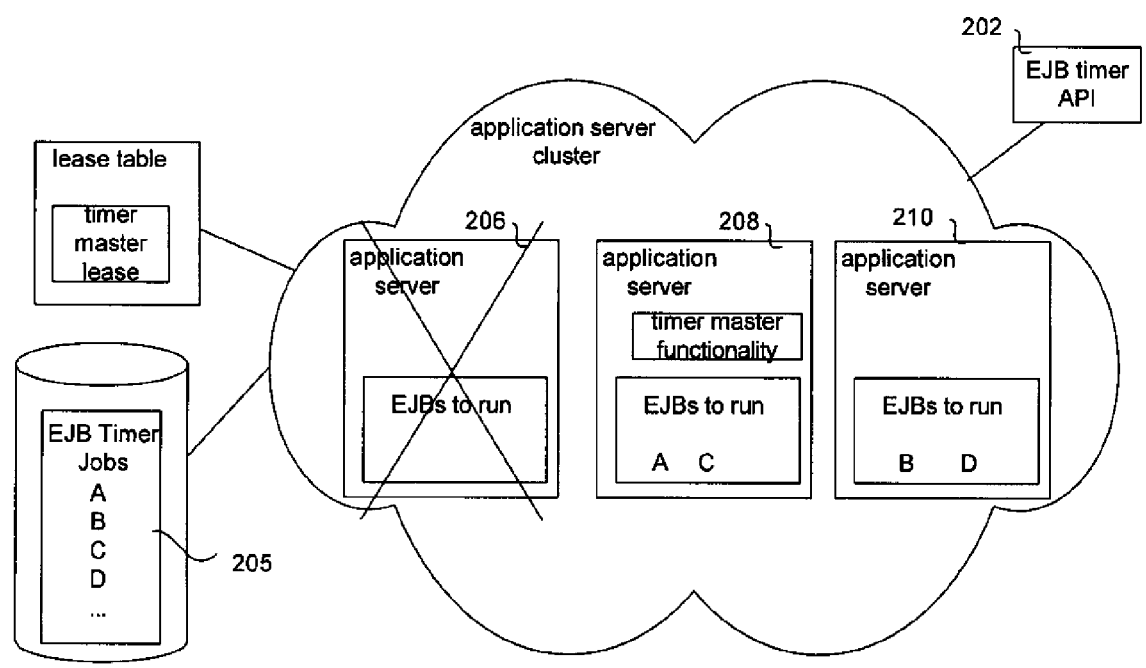

FIG. 2E shows a case where the application server instance 206 acting as the timer master goes down. In that case the other application server instances 208 and 210 can realize this failure and then one of the other application server instances can be assigned to do the timer master functionality. In this example, application server instance 208 is assigned to do the timer master functionality. The application server 208 acting as the new timer master can then reassign EJB Timer Job C.

Figure 3:
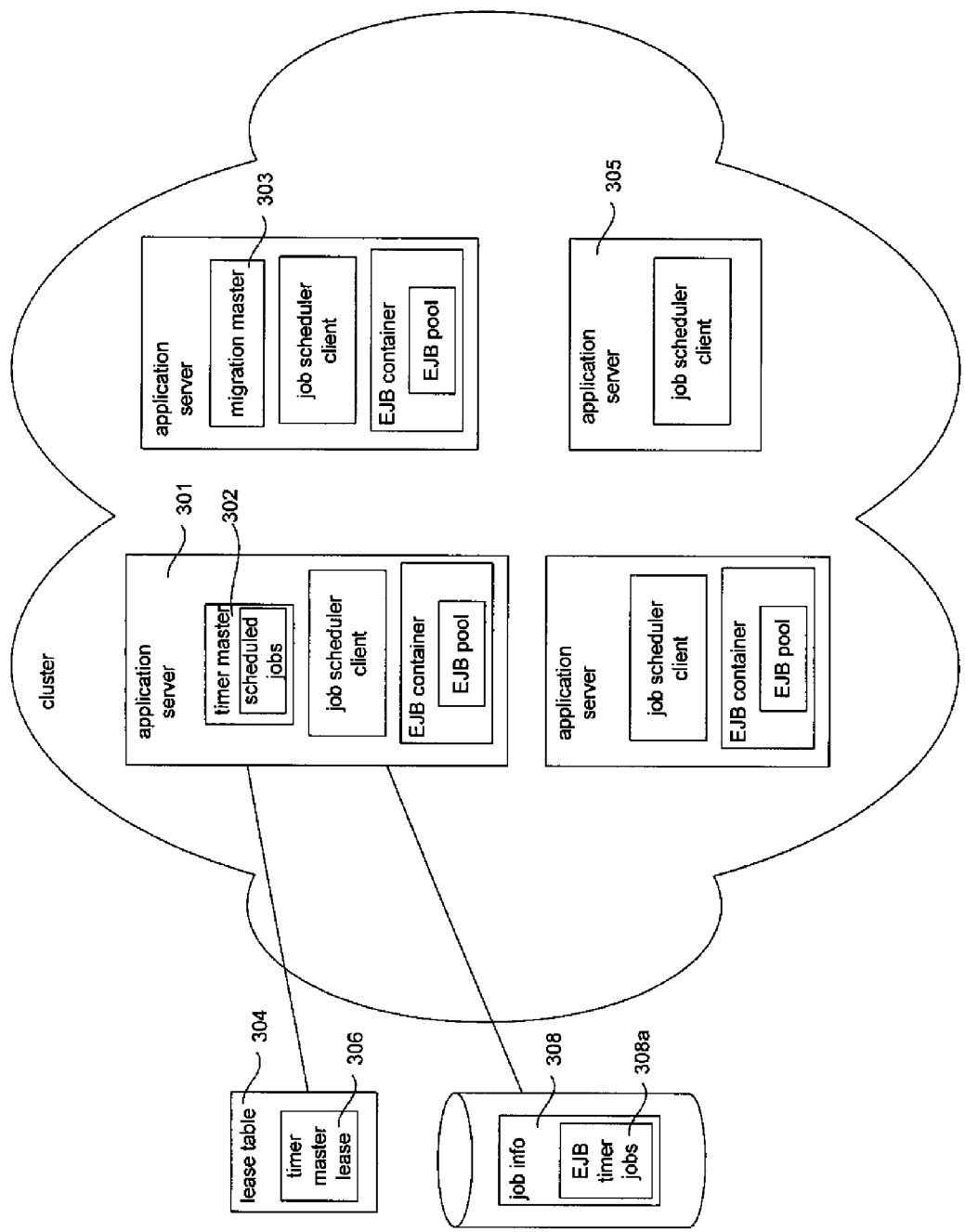
FIG. 3 show a clustered EJB timer system based on a job scheduler for one embodiment of the present invention.

FIG. 3 shows an example wherein the timer master 302 at the application server instance 301 is in charge of timer jobs other than just EJB timer jobs. The EJB timer jobs can then rely on this general purpose timer master 302.

The cluster is preferably homogenous but it is possible that an application server instance 305 of the cluster is not part of the distributed EJB timer system. The EJB timer info can indicate that the it is to be sent only to application server instances that are a part of the distributed EJB timer system The timer master 302 can assign scheduled jobs to other applications servers of the cluster. The application server can maintain a lease 306 for the timer master 302 from a lease table 304. The timer master 302 can store job info 308 for the scheduled jobs in a database. The job info can include EJB timer job info 308a. In the case of a crash of the application server 301, another application server of the cluster can be assigned the timer master, which can use the job info to assign scheduled jobs.

The scheduled jobs can include reports, such as database reports. Such reports can require a large number of database accesses and thus can take a lot of system resources. The scheduled jobs can thus be scheduled to run at an off-peak time so as to not reduce the performance of other applications. The lease table 304 can be in the database or alternately a database-less leasing system can be used. The timer master 302 can be a singleton service. The timer master 302 can be assigned to the application server 301 by a migration master. Other application servers can request jobs from the timer master.

Some of the services of the application servers, called singleton services, should be run on only one application server of a cluster. These singleton services can include JMS servers, transaction recovery services or any other software that should be only run in a single instance.

A migration master 303 can check the lease table 304 and reassign a singleton service to a second application server of a cluster if the application server holding the singleton service, such as the timer master, fails to maintain the lease. The lease table 304 can be maintained in a database or by using database-less leasing.

The application server 301 can fail to update the lease because of a crash of the first application server or the first application server 301 can fail to update the lease because the application server 301 is partitioned from the lease table. The application server 301 can heartbeat the lease 408 to maintain control of the singleton service. The singleton service can be a JMS server, a timer master or any other software that should be run in a single instance.

The application servers can run a predetermined activation script before getting the singleton service and run a predetermined deactivation script after giving up the singleton service. The migration master 303 can select the next application server to run the singleton service, such as by selecting the next application server.

Clustered EJB Timer Service can be an EJB timer service that is cluster aware. Users can be able to configure the new clustered timer service or a local-server based timer service. The EJB timers can be able to load balance and failover Timers for a given EJB can be accessible on all nodes in the cluster in which that EJB is deployed.

A timer need not exist in server memory unless a user requests it or it is about to expire. This is different from a timer service implementation where all timers remain in memory throughout their lifecycle. Although this will be more efficient in terms of memory usage, requests to access existing timers can be relatively slower since the timers will have to be loaded from the database.

Timers for a given EJB can be accessible on any node in the cluster. Invoking getTimers( ) on the javax.ejb.TimerService object can return a Collection of all timers in the cluster that were created for the EJB. The Job Scheduler can provide functionality to access existing timers via the TimerManager API. One API method can allow access to all timers created for a given TimerManager. This can allow access to all timers created for a stateless session bean or message driven bean deployment. EJB timers for 2.1 entity beans are different than stateless session or message driven bean timers in that an entity bean timer is tied to the primary key of the bean in which it was created. So, calling getTimers( ) from an entity bean with primary key "foo" will only return timers created from bean instances with that primary key. To efficiently support this case, we can make use of the timer_name column of the database table used by the Job Scheduler. In that column, we can store a string version of the entity beans primary key hashcode. Using the TimerManager method for obtaining timers by name, we can get all timers with the matching primary key hashcode. Since hashing collisions are possible, this set of timers will have to be filtered to ensure they are no timers for beans with other primary keys.

EJB timers can take advantage of the Job Scheduler's load balancing and failover capabilities. With some timer service implementations, if a server crashes, any timers created on that server will not execute until the server is brought back up. Also, once a timer is created on a server, it will remain on that server for the duration of its lifecycle. The clustered timer service can take advantage of the Job Schedulers load balancing and failover capabilities to solve these problems. Timers created with the clustered timer service can automatically failover to a healthy server and timer expirations may execute on any node in the cluster to which the EJB is deployed.

If the EJB Timeout method requires transactional execution, the TimerManager can be configured to start the transaction before the TimerListener is invoked. This can allow the database update that occurs after the TimerListener finishes executing, to be part of the transaction. This can prevent a given timeout from committing two transactions if it is executed twice.

EJB timers may be concurrently updated by multiple threads. A local timer service implementation may prevent two threads from updating a timer at the same time. This will no longer be the case with the clustered timer service, since the same timer may exist on multiple servers at once. For example, it is possible for a timer on Server1 to be executing a timeout while the same timer on Server2 is executing a cancel request. Locking at the database level can prevent any data stomping issues so this shouldn't cause problems.

EJB timers can be responsible for storing the application classloader annotation. Since EJB timers will be created in the context of an application but deserialized from the database outside of this context; there are potential classloader issues that must be addressed. This can be solved by storing the application classloader annotation in the database. Using the classloader annotation, we can ensure the proper context classloader is on the thread before application specific classes are deserialized.

It is possible that that an EJB may not be deployed to all members of a cluster. In this case, we need to ensure the TimerMaster does not delegate timer jobs to servers in which the EJB is not deployed. The TimerMaster will use the application classloader annotation to determine what servers in the cluster can service a given timer execution.

EJB timers can be removed when the application is undeployed. The timer's need not be removed during an application redeploy. If the situation arises where an application is redeployed and the Serializable class associated with active timers is changed incompatibly, the timers can fail to deserialize. The serialization errors will be logged but the timers will not be removed. The user may then have to undeploy the application completely to remove the timers or redeploy their application with a compatible version of the Serializable class used by the timers.

A Job Scheduler can make the timers cluster aware and provides the ability to execute them any where in the cluster. Timers are no longer tied to the server that created them.

The system can:
1. Make timescluster aware. Timers should be able to execute anywhere in the cluster and failover as needed.
2. Provide time based scheduling, such as a unit based cron job type of execution within the application server cluster. Users should be able to specify things like "execute this job repeatedly somewhere in the cluster. The job should run if there is at least one running member in the cluster". There is no dependency on the server that actually created the timer. The timer execution is load balanced across the cluster and is able to failover to another running member in case of failures.

There can be two types of timers that can be differentiated based on their lifecycle.

Local Timer

A local timer can be scheduled within a server JAVA Virtual Machine (JVM) and lives within the same JVM forever. The timer runs as long as the JVM is alive and dies when the JVM exits. The application needs to reschedule the timer on subsequent server startup.

Cluster Wide Timers

A cluster wide timer can be aware of other server JVM's that form part of the same cluster and is able to load balance and failover. The timer's lifecycle is not bound to the server that created it but it is bound to the lifecycle of the cluster. As long as at least one cluster member is alive the timer can be able to execute. Such timers are able to survive a complete cluster restart. Cluster wide timers are created and handled by the Job Scheduler.

Each type can have its own advantages and disadvantages. Local timers can handle fine grained periodicity in the order of milliseconds. Job schedulers cannot handle fine grained periodicity with precision as the timers need to be persisted. Cluster wide timers work well with coarse grained intervals in the order of few seconds or more. Job scheduler can be used to schedule jobs like running reports every day or at the end of every week. It can be important to run the job even if the server that created it is no longer available. Other cluster members can ensure that the job continues to execute.

In one embodiment, Job Scheduler can meet the following requirements:

1. Use customer configured database to persist timers and make them available to the entire cluster. Job Scheduler is dependent on a database and cannot function without it. Oracle, DB2, Informix, MySQL, Sybase, MSSQL are supported.

2. In one embodiment, the Job Scheduler will only work in a cluster.

3. Submitted jobs can run anywhere in the cluster. Two consecutive executions of a job can run on the same server or on different servers. Only one server can execute the job at any given point in time.

4. Job Scheduler is dependent on Leasing. Leasing support is needed to elect the TimerMaster. Each server can also use leasing to claim ownership on the job before executing it.

5. Job Scheduler can use the same leasing basis as Server Migration and Singleton Services.

6. Job Scheduler can be bound into the global JNDI tree of each server using a well defined name. The JNDI name can be "weblogic.JobScheduler". Users can cast the looked up object to commonj.timers.TimerManager and use its methods to create jobs.

7. Only Serializable jobs are accepted by the Job Scheduler. Non-Serializable jobs can be rejected with an IllegalArgumentException.

8. ClusterMBean can expose an attribute called DataSourceForJobScheduler that will be used to access the database. In one embodiment, Job Scheduler functionality is only available with the datasource is configured.

9. In one embodiment, Job Scheduler will only support schedule at fixed delay functionality. Two consecutive job executions are separated by an 'interval' period.

10. In one embodiment, only round-robin load balancing of jobs is supported. Every cluster member will periodically poll the TimerMaster (which is just another cluster member) for ready jobs to execute. The TimerMaster will give a fraction of the total ready jobs to each member for execution.

Job Scheduler can require a database for persisting timers. All databases supported by Server Migration functionality can be supported by Job Scheduler as well.

In one embodiment, the Job Scheduler only functions in a cluster. All cluster nodes can participate in executing jobs without discrimination. In one embodiment, Job Scheduler will be turned on only if the DataSourceForJobScheduler ClusterMBean attribute is set to a valid data source in config.xml. Here is an example:

```
<domain>
    ...
    <cluster>
        <name>Cluster-0</name>
        <multicast-address>239.192.0.0</multicast-address>
        <multicast-port>7466</multicast-port>
        <data-source-for-job-scheduler>JDBC Data Source-0</data-source-for-job-scheduler>
    </cluster>
    ...
    <jdbc-system-resource>
        <name>JDBC Data Source-0</name>
        <target>myserver,server-0</target>
        <descriptor-file-name>jdbc/JDBC_Data_Source-0-3407-jdbc.xml</descriptor-file-name>
    </jdbc-system-resource>
</domain>
```

Job Scheduler can be looked up using the JNDI name "weblogic.JobScheduler" and cast to commonj.timers.TimerManager. Here is an example:

```
InitialContext ic = new InitialContext( );
commonj.timers.TimerManager jobScheduler =
    (common.timers.TimerManager)
ic.lookup("weblogic.JobScheduler");
    commonj.timers.TimerListener timerListener = new
    MySerializableTimerListener( );
    jobScheduler.schedule(timerListener, 0, 30*1000); // execute
    this job every 30 seconds
    ....
    ....
    private static class MySerializableTimerListener implements
    commonj.timers.TimerListener,
java.io.Serializable {
        public void timerExpired(Timer timer) { ... }
    }
```

Job scheduler can use leasing functionality to claim ownership of individual timers before execution and to select a Timer Master. The Timer Master can be running on exactly one cluster member and is responsible for allocating timers to individual servers. The leasing basis can be dependent on the ClusterMBean.getLeasingBasis( ) attribute. If the LeasingBasis is set to database then the configuration associated with database leasing can be setup just like in Server Migration. If the LeasingBasis is set to "consensus" then no database support is required for leasing.

Console can provide an option to set ClusterMBean.setDataSourceForJobScheduler( ). The data source can be inherited from server migration or session persistence during shutdown. If customers configure data source for one, they should be able to reuse it for Job Scheduler functionality as well.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A computer implemented system comprising:
   one or more computers, each including a microprocessor;
   an application server cluster executing on the one or more computers and including a plurality of application server instances, wherein the cluster implementing a distributed Enterprise Java Bean (EJB) timer system and providing an EJB timer application program interface (API) receives requests for timer jobs to be processed by the cluster, each timer job created by implementing a class and including an EJB timer configured to trigger an execution of an EJB deployed on the cluster when the corresponding EJB timer expires, and wherein information for the EJB timers is serialized and stored in a database which additionally stores classloader information of the classes implemented by the timer jobs; and
   a timer master that executes as a singleton service on one of the plurality of application server instances, each of which application server instances requests timer jobs from the timer master, wherein the timer master is configured to
      retrieve the information for the EJB timers from the database and deserialize the information,
      use the deserialized information to distribute the timer jobs among the application server instances,
      perform, for each timer job to be distributed, the steps of
         identifying, from the plurality of application server instances, an application server instance configured to execute the particular EJB associated with that timer job,
         retrieving, from the database, classloader information of the class implemented by that timer job,
         placing the classloader information of the implemented class on the identified application server instance to load the class thereon, wherein the placing utilizes the retrieved classloader information to load the corresponding EJB timer, and
      upon failure of the identified application server instance, use the information for the loaded EJB timer on the identified application server instance to reassign the distributed timer job from the identified application server instance, to another of the application server instances.

2. The computer implemented system of claim 1, wherein the application server instance that hosts the timer master maintains a lease for the timer master in a lease table in a database.

3. The computer implemented system of claim 2, wherein upon failure of the application server instance currently hosting the timer master, another application server instance in the cluster is reassigned to host the timer master.

4. The computer implemented system of claim 3, wherein the assignment of another application server instance to host the timer master functionality is performed by a migration master.

5. The computer implemented system of claim 1, wherein the timer master schedules jobs in addition to the timer jobs.

6. The computer implemented system of claim 1, wherein each of the application server instances is configured to view all of the scheduled timer jobs via the database.

7. The computer implemented system of claim 1, wherein the cluster contains an additional application server instance in addition to the plurality of application server instances.

8. A non-transitory computer readable storage medium including instructions stored thereon, which when read and executed by one or more computers cause the one or more computers to perform the steps comprising:
   configuring an application server cluster executing on the one or more computers and including a plurality of application server instances, wherein the cluster implementing a distributed Enterprise Java Bean (EJB) timer system and providing an EJB timer application program interface (API) receives requests for timer jobs to be processed by the cluster, each timer job created by implementing a class and including an EJB timer configured to trigger an execution of an EJB deployed on the cluster when the corresponding EJB timer expires, and wherein information for the EJB timers is serialized and stored in a database which additionally stores classloader information of the classes implemented by the timer jobs; and
   configuring a timer master that executes as a singleton service on one of the plurality of application server instances, each of which application server instances requests timer jobs from the timer master, wherein the timer master is configured to
      retrieve the information for the EJB timers from the database and deserialize the information,
      use the deserialized information to distribute the timer jobs among the application server instances,
      perform, for each timer job to be distributed, the steps of
         identifying, from the plurality of application server instances, an application server instance configured to execute the particular EJB associated with that timer job,
         retrieving, from the database, classloader information of the class implemented by that timer job,
         placing the classloader information of the implemented class on the identified application server instance to load the class thereon, wherein the placing utilizes the retrieved classloader information to load the corresponding EJB timer, and
      upon failure of the identified application server instance, use the information for the loaded EJB timer on the identified application server instance to reassign the distributed timer job from the identified application server instance, to another of the application server instances.

9. A method of providing an EJB cluster timer, comprising:
   providing an application server cluster executing on the one or more computers and including a plurality of application server instances, wherein the cluster implementing a distributed Enterprise Java Bean (EJB) timer system and providing an EJB timer application program interface (API) receives requests for timer jobs to be processed by the cluster, each timer job created by implementing a class and including an EJB timer configured to trigger an execution of an EJB deployed on the cluster when the corresponding EJB timer expires, and wherein information for the EJB timers is serialized and stored in a database which additionally stores classloader information of the classes implemented by the timer jobs; and providing a timer master that executes as a singleton service on one of the plurality of application server instances, each of which application server instances requests timer jobs from the timer master, wherein the timer master is configured to retrieve the information for the EJB timers from the database and deserialize the information, use the deserialized information to distribute the timer jobs among the application server instances, perform, for each timer job to be distributed, the steps of
identifying, from the plurality of application server instances, an application server instance configured to execute the particular EJB associated with that timer job, retrieving, from the database, classloader information of the class implemented by that timer job, placing the classloader information of the implemented class on the identified application server instance to load the class thereon, wherein the placing utilizes the retrieved classloader information to load the corresponding EJB timer, and upon failure of the identified application server instance, use the information for the loaded EJB timer on the identified application server instance to reassign the distributed timer job from the identified application server instance, to another of the application server instances.

10. The method of claim 9, wherein the application server instance that hosts the timer master maintains a lease for the timer master in a lease table in a database.

11. The method of claim 10, wherein upon failure of the application server instance currently hosting the timer master, another application server instance in the cluster is reassigned to host the timer master.

12. The method of claim 11, wherein the assignment of another application server instance to host the timer master functionality is performed by a migration master.

13. The method of claim 9, wherein the timer master schedules jobs in addition to the timer jobs.

14. The method of claim 9, wherein each of the application server instances is configured to view all of the scheduled timer jobs via the database.

15. The method of claim 9, wherein the cluster contains an application server instance in addition to the plurality of application server instances.

16. The computer implemented system of claim 1, wherein the cluster contains an additional application server instance in addition to the plurality of application server instances.

17. The computer implemented system of claim 1, wherein the system enables scheduled jobs to be submitted to be run within the cluster.

18. The method of claim 9, wherein scheduled jobs can be submitted to be run within the cluster.

\* \* \* \* \*